(12) United States Patent
Hegler

(10) Patent No.: US 6,578,608 B2
(45) Date of Patent: Jun. 17, 2003

(54) PIPE CONSTRUCTION KIT

(76) Inventor: Ralph Peter Hegler, Schillerstrasse 7, D-97688 Bad Kissingen (DE)

( * ) Notice: Subject to any disclaimer, the term of this patent is extended or adjusted under 35 U.S.C. 154(b) by 0 days.

(21) Appl. No.: 10/052,134

(22) Filed: Jan. 17, 2002

(65) Prior Publication Data
US 2002/0108661 A1 Aug. 15, 2002

(30) Foreign Application Priority Data

Feb. 9, 2001 (EP) .............................................. 01103049

(51) Int. Cl.7 ................................................. F16L 11/11
(52) U.S. Cl. ....................... 138/109; 138/120; 138/155; 138/DIG. 11; 285/903
(58) Field of Search ............................... 138/109, 121, 138/120, 155, DIG. 11; 285/903

(56) References Cited

U.S. PATENT DOCUMENTS 3,926,222 A * 12/1975 Shroy et al. ................. 138/122
4,913,473 A * 4/1990 Bonnema et al. ............ 285/423
5,071,173 A * 12/1991 Hegler et al. ................ 285/138
5,405,569 A * 4/1995 Lupke ......................... 264/504
5,992,469 A * 11/1999 Hegler ........................ 138/109
5,996,635 A * 12/1999 Hegler ........................ 138/109
6,199,592 B1 * 3/2001 Siferd et al. ................. 138/109
6,399,002 B1 * 6/2002 Lupke et al. ................ 264/139
2001/0013673 A1 * 8/2001 Siferd et al. ................. 138/109

FOREIGN PATENT DOCUMENTS

WO    PCT/CA99/00937    6/2000

* cited by examiner

Primary Examiner—James Hook
(74) Attorney, Agent, or Firm—Robert F. I. Conte; Barnes & Thornburg

(57) ABSTRACT

A pipe construction kit comprises two pipe sections in the form of twin-wall pipes. A spigot is formed on one end of a pipe section, while a socket is formed on the associated end of the other pipe section. The socket and the spigot are twin-wall pipes, having predominantly smooth-walled internal pipe sections and corrugated external pipe sections with elevations and troughs. The outside diameter of the pipe sections and the outside diameter of the socket are approximately equal.

3 Claims, 2 Drawing Sheets

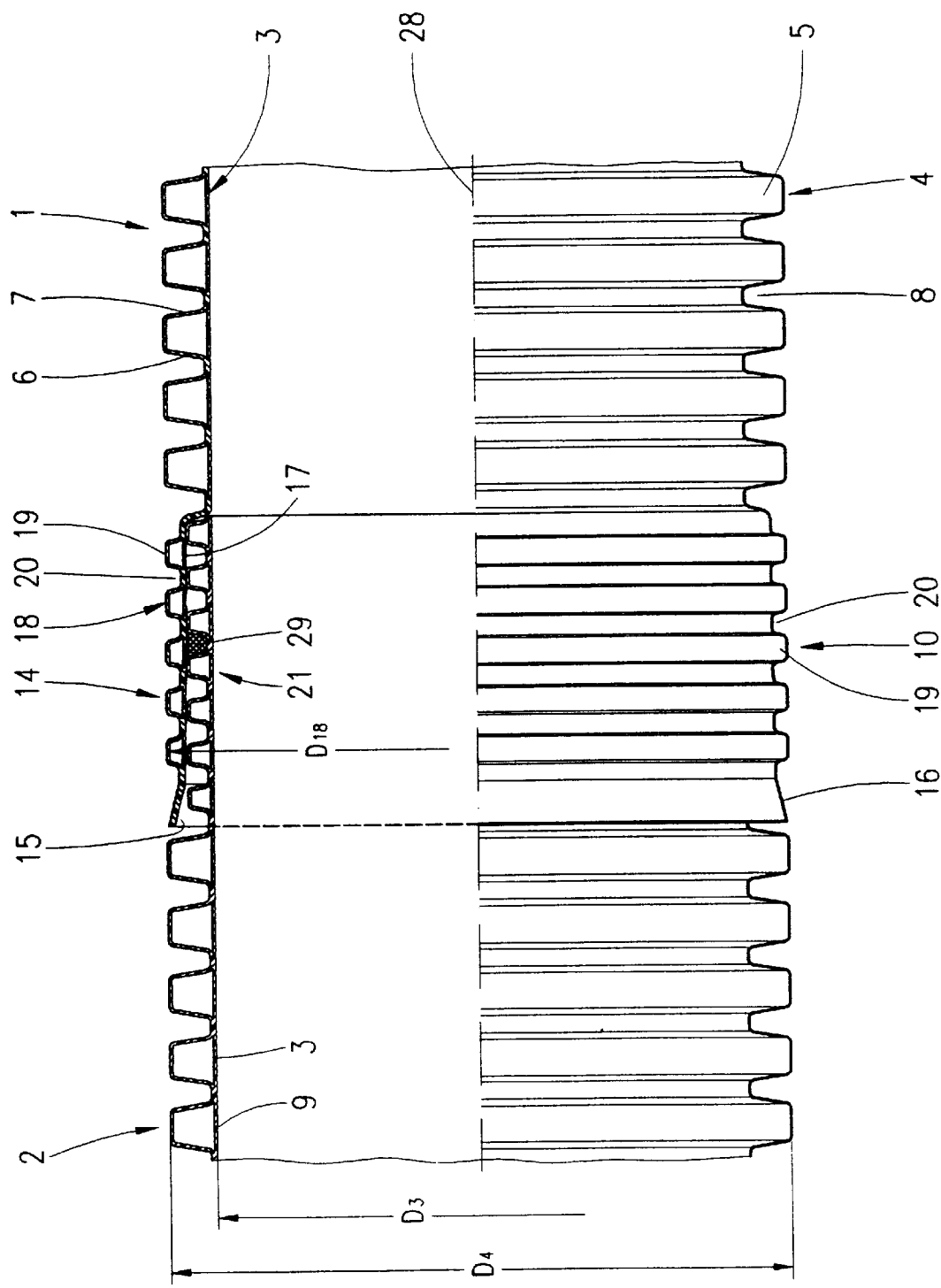

PIPE CONSTRUCTION KIT

BACKGROUND OF THE INVENTION

1. Field of the Invention

The invention relates to a pipe construction kit comprising a first and a second pipe section of plastic material, each of which having a smooth-walled cylindrical internal pipe and a corrugated external pipe with annular cylindrical elevations and troughs, and an outside diameter $D_4$; a socket, which is in-line molded on one end of the first pipe section, having an outside diameter $D_{18}$ and an inside diameter $D_{17}$; and a spigot, which is in-line molded on an end of the second pipe section, comprising the internal pipe and a second external pipe section, and having an outside diameter $D_{22}$, to which the following applies in relation to the inside diameter $D_{17}$ of the socket: $D_{22} \approx D_{17}$.

2. Background Art

A pipe construction kit of the generic type is known from U.S. Pat. No. 5,071,173. This known design includes a smooth-walled pipe socket, the outside diameter of which does not project over the outside diameter of the elevations of the pipe sections. In this way, this known design enables the pipe construction kits of the species to be used for sewer pipe reconstruction, because the consecutively joined-on pipe sections have a uniform maximum outside diameter. Likewise, this design of a pipe socket has the advantage that transporting the pipe sections which have a socket at one end and a spigot at the other is possible without the risk of socket damaging. If the spigot also has an outside diameter that corresponds to the outside diameter of the pipe sections—which is prior art—and if, consequently, the socket has an internal diameter that corresponds at least to the outside diameter of the pipe sections, then there is the risk of the socket being damaged during transportation. Moreover, the socket does not impede the insertion of interconnected pipes in conduits and the like. The internal pipes of these twin-wall pipes are smooth-walled, having, however, some minor manufacturing irregularity. The term "smooth-walled" as employed in this application also includes this minor irregularity.

In the case of great nominal widths, for instance in the case of nominal widths $\geq$ DN 400, there is the problem of sockets that have smooth walls internally and externally no longer being sufficiently stable.

U.S. Pat. No. 5,992,469 teaches to provide sockets that are in-line molded on corrugated twin-wall pipes also in the form of twin-wall pipes over part of their axial length, having a smooth-walled internal pipe section and a corrugated external pipe section with elevations and troughs. This known design has the drawback that the outside diameter of the socket distinctly exceeds the outside diameter of the pipe sections, because the respective regular pipe section is also employed as a spigot.

SUMMARY OF THE INVENTION

It is an object of the invention to embody a pipe construction kit of the generic type in such a way that high stability of the pipe socket is reached and the advantages of the species are maintained.

According to the invention, this object is attained in that the socket is a twin-wall pipe having a smooth-walled internal pipe section and a corrugated first external pipe section with elevations and troughs. The gist of the invention resides in that the spigot as well as the socket are twin-wall pipe sections with the available overall height of the elevations of the pipe sections, inclusive of the thickness of the internal pipes of the pipe sections, being split up among the height of the elevations, inclusive of the internal pipe section of the socket, and the height of the elevations and of the internal pipe of the spigot. A favorable splitting ratio is reflected by $0.3 (H_{18}+H_{22}) \leq H_{18} \leq 0.7(H_{18}+H_{22})$ applying to the radial height $H_{18}$ of the socket as compared to the radial height $H_{22}$ of the spigot.

The elevations of the socket on the one hand and of the spigot on the other have a clearly smaller spacing than the elevations of the pipe sections. Favorable relations of this are reflected by $0.3\ T_5 \leq T_{19} \leq 0.7\ T_5$ applying to the spacing $T_5$ of the elevations of the pipe sections as compared to the spacing $T_{19}$ of the socket, and by $0.3\ T_5 \leq T_{23} \leq 0.7\ T_5$ applying to the spacing $T_5$ of the elevations of the pipe sections as compared to the spacing $T_{23}$ of the elevations of the spigot.

Further features, advantages and details of the invention will become apparent from the ensuing description of an exemplary embodiment, taken in conjunction with the drawing.

BRIEF DESCRIPTION OF THE DRAWING

FIG. 2 is an illustration of a pipe joint between two pipe sections after the twin-wall pipe has been cut through.

DESCRIPTION OF THE PREFERRED EMBODIMENT

Figure 1:
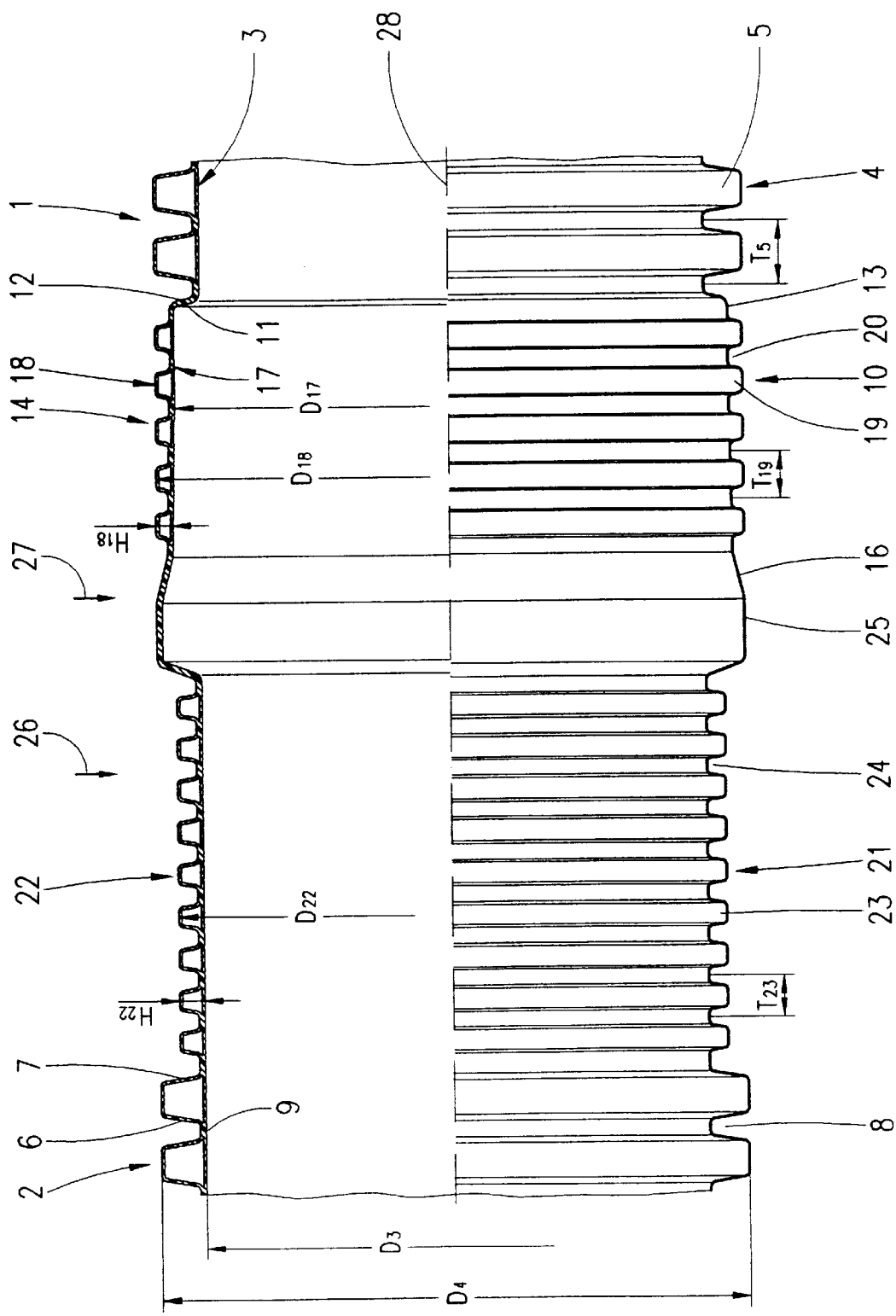
FIG. 1 is a partial lengthwise sectional view of a twin-wall pipe that is continuously produced from a pipe section, a socket and another pipe section.

As seen in FIG. 1, a twin-wall pipe is continuously produced, forming an extruded run of piping which substantially consists of the virtual pipe sections 1, 2. They generally include a smooth-wall, cylindrical internal pipe 3 and a corrugated external pipe 4. This external pipe 4 has approximately trapezoidal elevations 5, a trough 8 being formed between the flanks 6, 7 of two adjacent elevations 5. At the bottom 9 of the trough 8, the external pipe 4 and the internal pipe 3 are welded together. Twin-wall pipes of this type and structure are generally known and widely spread in practice.

Adjoining the pipe section 1, a socket 10 is formed between the two pipe sections 1, 2. In the vicinity of the socket bottom 11 i.e., subsequent to an expanded section 12 of the pipe section 1, the socket 10 has a short, smooth-walled and cylindrical section 13. This smooth-walled section 13, same as the expanded section 12, has a predominantly single-wall configuration instead of a twin-wall design. The smooth-walled section 13 is again followed by a twin-wall pipe section 14. Subsequent thereto, the socket 10 is again of single-wall design, including an insertion section 16 that expands conically outwards toward an inlet 15. Fundamentally, the twin-wall pipe section 14 is structured in the same way as the pipe sections 1 and 2, i.e., it has a substantially cylindrical, smooth-wall internal pipe section 17 and a corrugated first external pipe section 18 with elevations 19, with the first external pipe section 18 and the internal pipe section 17 being welded together in the vicinity of the troughs 20. The elevations 19 are disposed substantially over the full length of the socket 10 with the exception of the insertion section 16 and the short section 13.

Formed between the socket 10 and the pipe section 2, and directly subsequent thereto, is a spigot 21, the inside of which is formed and defined by the internal pipe 3. It is provided with a corrugated second external pipe section 22 with elevations 23, the second external pipe section 22 and the internal pipe 3 also being welded together in the vicinity of the troughs 24. The outer contours of all the elevations 5, 19, 23 are substantially annular cylindrical.

Located between the socket 10 and the spigot 21 is a transition section 25 which is cut out as waste by two saw cuts 26, 27 as seen in FIG. 1. Since this cutting job takes place continuously, a pipe section 1 or 2 is obtained, having a socket 10 at one end and a spigot 21 at the other. As seen in FIG. 2, the illustrated spigot 21 of the pipe section 2 serves for insertion into the socket 10 of the neighboring pipe section 1, as a result of which two pipe sections 1, 2 are interconnected. Upon complete insertion of the spigot 21 into the socket 10, the foremost elevation 23 bears against the expanded section 12 in the vicinity of the socket bottom 11, in which case the elevation 5 that adjoins the spigot 21 lies in direct vicinity to the inlet 15 of the insertion section 16 of the socket 10. Consequently, the length of the spigot 21 and the length of the socket 10 are approximately equal.

The pipe sections 1, 2 have an outside diameter $D_4$ that corresponds to the outside diameter of the external pipe 4. The socket 10 has an outside diameter $D_{18}$ that corresponds to the outside diameter of the first external pipe section 18, with the outside diameter of the insertion section 16 not exceeding $D_{18}$. The outside diameter $D_{22}$ of the spigot 21 corresponds to the outside diameter of the second external pipe section 22. The inside diameter $D_{17}$ of the socket 10 corresponds to the inside diameter of the internal pipe section 17. The outside diameter $D_{22}$ of the spigot 21 and the inside diameter $D_{17}$ of the socket 10 are approximately equal—allowing for some minor clearance and work tolerances. In this regard, $1.01\ D_{22} \leq D_{17} \leq 1.02\ D_{22}$ applies. As for the outside diameter $D_{18}$ of the socket 10 in relation to the outside diameter $D_4$ of the pipe sections 1 and 2, respectively, $D_4 \approx D_{18}$ applies.

The overall height $H_{22}$ of the elevations 23 of the second external pipe section 22, inclusive of the wall thickness of the internal pipe 3, exceeds the overall height $H_{18}$ of the elevations 19, inclusive of the thickness of the internal pipe section 17 of the first external pipe section 18 of the socket 10. $0.3\ (H_{18}+H_{22}) \leq H_{18} \leq 0.7\ (H_{18}+H_{22})$ applies. As further seen in the drawing, the following applies to the spacing $T_{19}$ of the elevations 19 of the socket 10 in relation to the spacing $T_5$ of the elevations 5 of the pipe sections 1, 2 in the direction of the central longitudinal axis 28: $0.3\ T_5 \leq T_{19} \leq 0.7\ T_5$. As for the spacing $T_{23}$ of the elevations 23 of the spigot 21, $0.3\ T_5 \leq T_{23} \leq 0.7\ T_5$ applies by analogy.

As results from the above explanations, the axial extension and the radial extension of the troughs 24 of the spigot 21 are considerably smaller than those of troughs 8 of the pipe sections 1 and 2. Therefore, an O-ring 29 disposed in the trough 24 may have a substantially smaller volume than an O-ring that is to be disposed in a trough 8.

Manufacturing the continuous twin-wall pipe, in which a socket 10 and a spigot 21 are in-line molded between two pipe sections 1 and 2, takes place by the aid of familiar technology, for instance as specified and described in EP 0 563 575 B1 or EP 0 890 770 A2, which may be referred to.

What is claimed is:

1. A pipe construction kit comprising:
   a first and a second pipe section (1, 2) of plastic material, each of which having;
   a smooth-walled cylindrical internal pipe (3) and a corrugated external pipe (4) with annular cylindrical elevations (5) that have a spacing $T_5$ and troughs (8), and an outside diameter $D_4$;
   a socket (10), which is in-line molded on one end of the first pipe section (1), having;
   an outside diameter $D_{18}$,
   an inside diameter $D_{17}$, and
   a radial height $H_{18}$; and
   a spigot (21), which is in-line molded on an end of the second pipe section (2), the spigot having;
   the internal pipe (3) and
   a second external pipe section (22) with annular cylindrical elevations (23) of a
   radial height $H_{22}$ and of a spacing $T_{23}$, and having
   an outside diameter $D_{22}$, wherein the outside diameter $D_{22}$ is substantially the
   same as the inside diameter $D_{17}$ of the socket (10);
   wherein the socket (10) is a twin-wall pipe having a smooth-walled internal pipe section (17) and a corrugated first external pipe section (18) with elevations (19) of a spacing $T_{19}$ and troughs (20),
   wherein the outside diameter $D_4$ of the external pipe (4) is substantially the same as the outside diameter $D_{18}$ of the socket (10) and wherein the formula of 0.3(the radial height $H_{18}$+the radial height $H_{22}$)≦the radial height $H_{18}$≦0.7(the radial height $H_{18}$+the radial height $H_{22}$) applies to the determination of the radial height $H_{18}$ of the socket (10) in relation to the radial height $H_{22}$ of the spigot (21).

2. A pipe construction kit according to claim 1, wherein the formula (0.3)(the spacing $T_5$) spacing $T_{19}$≦(0.7)(the spacing $T_5$) applies to the determination of the spacing $T_5$ of the elevations (5) of the pipe sections (1,2) as compared to the spacing $T_{19}$ of the socket (10).

3. A pipe construction kit according to claim 1, wherein the formula (0.3)(the spacing $T_5$) spacing $T_{23}$≦(0.7)(the spacing $T_5$) applies to the determination of the spacing $T_5$ of the elevations (5) of the pipe sections (1, 2) as compared to the spacing $T_{23}$ of the spigot (21).

* * * * *